Dec. 31, 1963  A. T. VAN ETTEN  3,116,238
CENTRIFUGAL CLASSIFIER
Filed Oct. 2, 1961  2 Sheets-Sheet 1
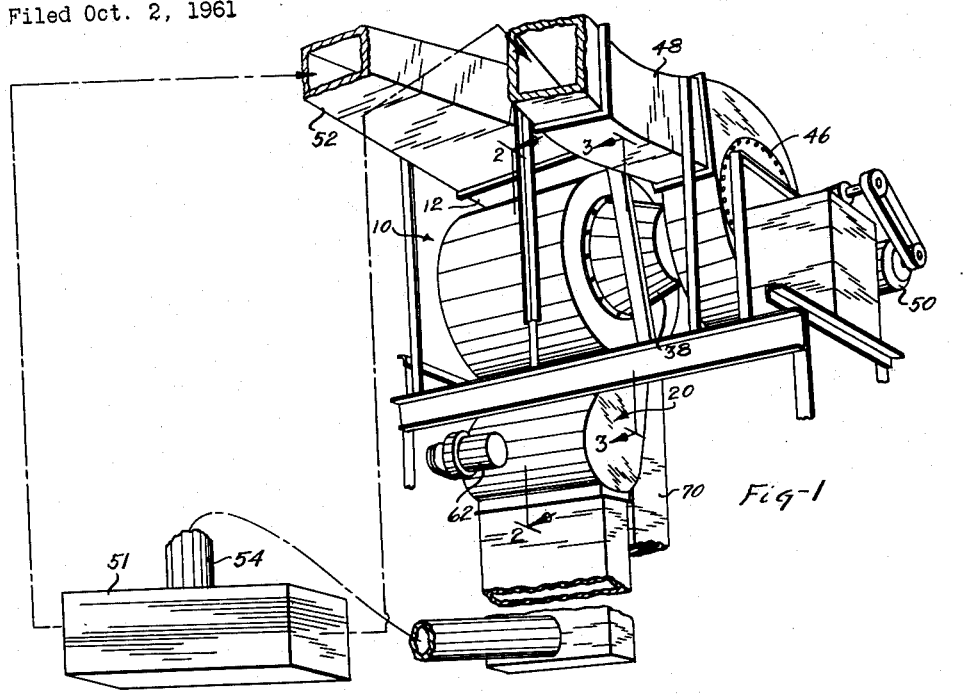
Fig-1
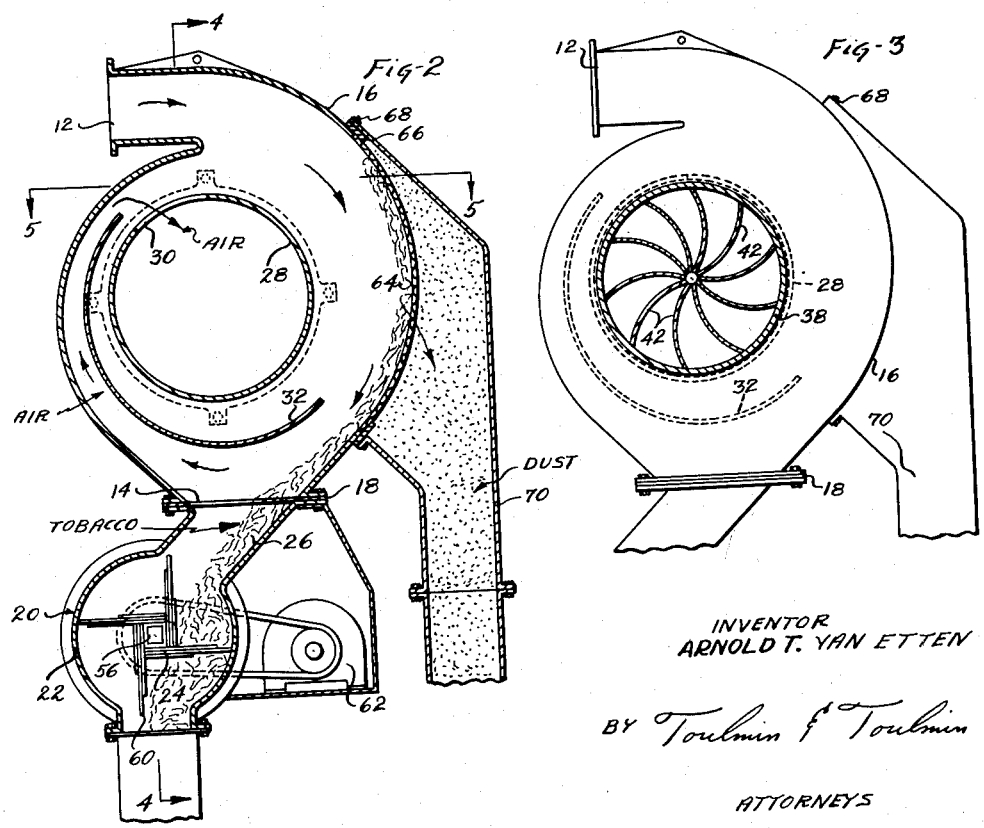
Fig-2
Fig-3
INVENTOR
ARNOLD T. VAN ETTEN
BY Toulmin & Toulmin
ATTORNEYS

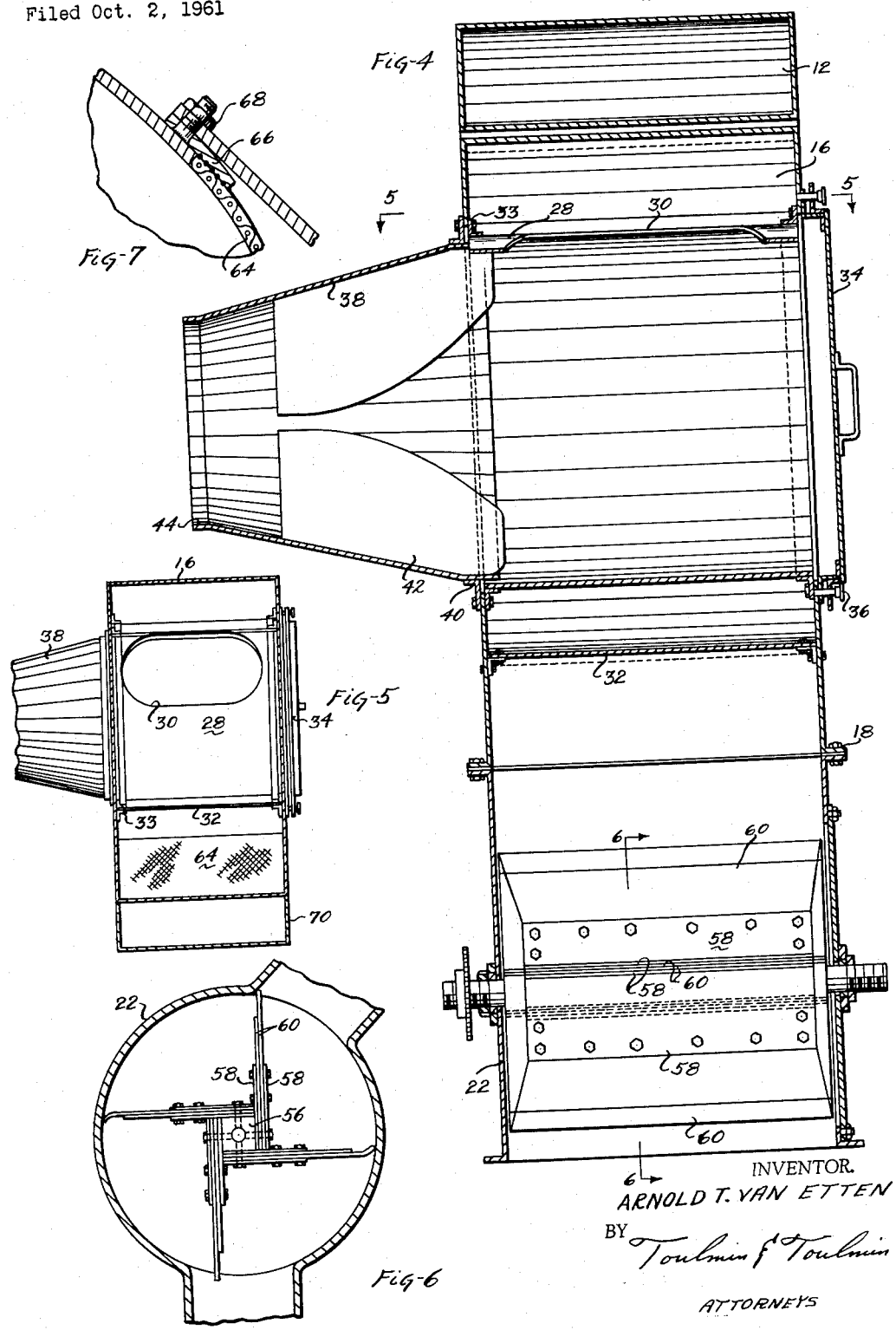

United States Patent Office 3,116,238
Patented Dec. 31, 1963

3,116,238
CENTRIFUGAL CLASSIFIER
Arnold T. Van Etten, Louisville, Ky., assignor to Griffin Industries, Inc., Louisville, Ky., a corporation of Kentucky
Filed Oct. 2, 1961, Ser. No. 142,339
3 Claims. (Cl. 209—250)

This invention relates to a separating arrangement and is particularly concerned with the separation of a gaseous conveying medium, such as air from material which is conveyed thereby.

The broad idea of separating a gaseous vehicle, such as air from material entrained therein, is widely known in dust collecting systems and the like. Such systems ordinarily employ a cyclone separator in which the air and the material entrained therein are introduced tangentially into the upper end of a generally conical vertical casing so that the material in the air tends to throw out against the casing by centrifugal action. The air is discharged from the device from the center at the top and by the time the air reaches the casing, all, or substantially all of the material entrained therein, has been dropped into the cyclone casing.

The solid material is removed from the bottom of the casing through any suitable arrangement which will prevent air from leaking back into the cyclone. While an arrangement of this type is generally satisfactory for such operations as separating dust and other wastes from air, it is not entirely satisfactory where the material entrained in the air is a valuable product and which may be of such a nature that it is not desired to damage the product.

A particular instance of such a product is tobacco which is generally conveyed by an air stream but which is preferably separated from the air stream with as little damage as possible to the tobacco.

Many other useable products can be conveyed by air and separated therefrom such as fibers of the nature of cotton, woodchips, sawdust and other substances characterized in being relatively light and either fibrous or pulverulent in nature.

With the conventional type cyclone arrangement referred to above, small air leaks will destroy the smooth operation of the cyclone and there is also a tendency for the delivery of solid material from the cyclone to be intermittent rather than uniform. Still further, the material separated from the air stream in a regular cyclone is caused to rotate many times around within the funnel of the cyclone and this leads to breakage and abrasion of the cyclone and can even develop heat in the material. Such standard cyclones are generally quite bulky and are disposed vertically and thus require a large amount of head room.

Because of the bulk of such separators, it is customary to mount them externally of a building so that space requirements are not a problem and in which location the discharged air can be exhausted to the atmosphere with any residue of the material entrained therein.

Having the foregoing in mind, the present invention proposes an improved type separator of the nature of a cyclone separator but which is much more compact than heretofore known cyclone separators.

Another object of this invention is the provision of a cyclone type separator in which the material entrained in the air separates very quickly from the air so that it is not broken or abraded in passing through the collector.

Still another object of this invention is the provision of a separator of the nature referred to in which the separation of the material and the delivery thereof to the outlet is substantially uniform so long as there is a uniform supply of material to the inlet of the separator.

Still a further object of this invention is the provision of a separating arrangement for use in a closed circuit wherein air discharged from the collector is again used for conveying material to the collector in which the air does not become heated and in which there is substantially no leakage of air to or from the system.

A particular object of the present invention is the provision of a separator of the nature referred to especially adapted for separating tobacco from conveying air in which there is a particularly large capacity reservoir provided in the outlet of the separator so that the movement of air in the separator is not impeded by tobacco collecting in the collector outlet.

Still a further object of this invention is the provision of a collector in which fines and dusts are separated from the air separately from the separation of the tobacco or heavier particles therefrom.

Still another object of this invention is the provision of an improved air lock valve at the top of the collector which substantially eliminates leakage of air to and from the collector and which minimizes breakage or abrasion of tobacco being discharged from the collector.

A still further object of this invention is the provision of an improved air exit arrangement for a collector of the nature disclosed of simplified structure but highly efficient in operation.

These and other objects and advantages will become more apparent upon reference to the following specification taken in connection with the accompanying drawings in which:

FIGURE 1 is a more or less diagrammatic view of a collector according to the present invention indicated as being incorporated in a simple system;

FIGURE 2 is a vertical transverse section through the collector and is indicated by line 2—2 on FIGURE 1;

FIGURE 3 is a vertical sectional view indicated by line 3—3 on FIGURE 1 showing an air straightening vane arrangement in the air discharge of the collector;

FIGURE 4 is a vertical sectional view drawn at enlarged scale and indicated by line 4—4 on FIGURE 2;

FIGURE 5 is a sectional view indicated by line 5—5 on FIGURE 2 showing the tubular air outlet member located on the axis of the collector;

FIGURE 6 is a sectional view indicated by line 6—6 on FIGURE 4 showing the rotary valve member forming the air lock at the outlet of the collector; and FIGURE 7 is a fragmentary view showing the manner in which a screen through which dust and fines separate from the air is placed in the casing of the collector so that the air can pass over the screen without encountering any obstructions.

Referring to the drawings somewhat more in detail, the separator of the present invention will be best seen in FIGURES 1 through 4. The collector comprises a generally cylindrical central housing portion 10 having a tangential inlet 12 having an outlet opening at 14. The inlet opening merges with the outer wall 16 of the housing and this wall also leads directly to one side of outlet opening 14. The housing of the separator is flanged about the outlet opening as at 18 and sealingly connected to this flange is a discharge valve 20 having a cylindrical part 22 in which is rotatably mounted a valve 24.

Between the cylindrical portion 22 of the air lock and the flange 18 of the separator is an elongated neck 26 which provides a reservoir of substantial size for material which is separated from the conveying air. This reservoir is important because it will retain a considerable quantity of material so that during periods of a high rate of delivery to inlet 12, separation of material from the air can take place without the material building up and obstructing the important peripheral movement of air in the housing of the separator.

Set somewhat off center from the center of the cylindrical housing of the separator is a cylindrical air discharge member 28. As member 28 is arranged, it will be observed that the air passage starting from the inner end of inlet 12 around the casing in a clockwise direction gradually diminishes in cross section. This serves to maintain the air at high velocity and insures a good separating action, and insures that any material carried by the air around to the smaller end of the decreasing air passage will be moving at sufficient velocity so that it will pass on by the inlet opening 30 provided in member 28. Further to insure that material will not enter inlet opening 30 there is an arcuate baffle member 32 in the casing extending over about 180° thereof and positioned about one-half way between member 28 and the housing of the separator.

As will be seen in FIGURE 4, cylindrical member 28 is retained in the casing of the separator as by the angles 33 mounted on the ends of the said member and which are bolted to the casing. Cylindrical member 28 is supported at both ends and at one end thereof on the outside of the separator there is provided the removable inspection door 34 releasably retained in position by the clamp members 36.

At the other end, the cylindrical member 28 opens into a tapering air discharge funnel 38 having flange means 40 thereon by means of which it is connected to the housing of the separator. As the device is constructed, the door 34 and the outlet funnel 38 can be interchanged so that either right or left hand operation can be had.

Within funnel 38 are a plurality of grooved vanes 42 that serve as straightening vanes so that air entering the discharge funnel from cylindrical member 28 and which air is rotating at a high rate of speed, will be straightened out and will be moving axially by the time it emerges from discharge end 44 of the funnel.

As will be seen in FIGURE 1, the discharge end of the funnel 38 is connected to the inlet of a fan 46 that discharges into a conduit 48.

The fan 46 is driven by a motor 50 connected to the rotatable part of the fan in any suitable manner.

Conduit 48 leads to a station 51 where it picks up tobacco and then passes on to a conduit 52 that is connected to inlet 12 of the separator. As illustrated in FIGURE 1, tobacco is supplied to station 51 by supply means 54. This supply means 54 may, for example, be connected to the discharge of another separator to which tobacco has been conveyed by another air straightener.

The aforementioned valve 24 in the air lock will be seen in FIGURES 4 and 6. This member comprises a central square shaft 56 and attached to each face thereof is a blade means consisting of outer metal plates 58 and intermediate resilient rubber-like blade members 60, one extending to the periphery of the cylindrical portion 22 and the other being somewhat shorter and back of the longer blade without interfering with the flexing of the outer tip thereof.

Blades of this nature can be constructed, for example, of fabric impregnated with rubber or a rubber-like material such as synthetic rubber. The blades provide for adequate sealing of the air lock so air does not enter and leave the separator freely and, at the same time, the material being discharged from the separator is handled without breakage or abrasion and the quantity discharged can readily be regulated by controlling the speed of rotation of the valve. The valve is rotated by being drivingly connected with a motor 62 supported in any suitable manner on the housing of the separator.

It has been mentioned that dust and fines are separated from the air stream and this is accomplished by setting a screen 64 in the wall of the separator housing so that it forms a part of the outer wall leading from inlet 12 to outlet 14. This screen 64 is preferably mounted on a frame 66 adapted for being secured to the housing of the separator by stud and nut means 68 so that the screen is flush with the inside of the housing wall and thus does not obstruct the movement of air and larger particles of material around the inside of the separator.

Dust and fines that pass through screen 64 are conveyed from the separator by a duct 70.

I claim:

1. A centrifugal classifier for separating finely divided material such as cut tobacco and the like from vehicle air comprising a generally scroll-like casing on a horizontal axis, said casing being formed with a first aperture opening substantially horizontally and tangentially into the casing at the top, said casing being formed with a second aperture in the bottom of the casing, an outlet duct connected to the casing around said second aperture and extending from the casing at the bottom and having one wall forming a continuation of the wall of the casing leading from the first aperture around the casing to the second aperture, said outlet duct comprising a neck portion of substantial size for retaining material therein and also comprising a cylindrical housing into which the neck portion opens, a paddle wheel rotatably mounted on the axis of said cylindrical housing and having resilient blade means engaging the periphery of the housing for discharging material from the cylindrical housing while preventing vehicle air from passing freely therethrough, a cylindrical air outlet member extending horizontally through said casing on the axis thereof and radially spaced from the casing, said air outlet member being formed with a single large opening toward the top and to the side of the center of the air outlet member, a curved baffle member between the air outlet member and the casing extending from about the upstream side of the opening in the air outlet member in a direction opposite the direction which air takes in the casing as it enters said first aperture to a point somewhat upstream of the second aperture in the casing, a blower having a suction opening axially aligned with said air outlet member and laterally spaced from said casing, a connector member connecting the suction side of the blower with the casing about the periphery of said air outlet member, and straightening vanes in said connector for straightening the path of movement of the air moving toward the blower thereby to increase the efficiency of operation of the blower.

2. A centrifugal classifier according to claim 1 in which said casing is formed with a third aperture of the size of the air outlet member on the side opposite said connector, and a detachable cover plate mounted on the casing closing said third aperture.

3. A centrifugal classifier according to claim 1 in which said casing is formed with an opening in the circumferential wall thereof between said first and second apertures, a screen set into the said opening and forming a continuation of the curvature of the circumferential wall of the casing through which dust and fines can pass but through which the bulk of the material entrained in the vehicle air cannot pass, and duct means outside the casing connected at one end to the circumferential wall of the casing around said opening and leading from the casing for conveying the fines and dust therefrom that pass through said screen.

References Cited in the file of this patent

UNITED STATES PATENTS

| | | |
|---|---|---|
| 1,659,695 | Mayhew | Feb. 21, 1928 |
| 2,288,734 | Noack | July 7, 1942 |
| 2,643,734 | Rowell | June 30, 1953 |
| 3,017,993 | MacPherson | Jan. 23, 1962 |

FOREIGN PATENTS

| | | |
|---|---|---|
| 476,711 | Great Britain | Dec. 14, 1937 |
| 255,948 | Switzerland | Feb. 1, 1949 |
| 974,413 | France | Sept. 27, 1950 |